(12) United States Patent
Ehrlich

(10) Patent No.: US 10,737,542 B2
(45) Date of Patent: Aug. 11, 2020

(54) LOAD REGULATED TIRE INFLATION SYSTEM

(71) Applicant: Wabash National, L.P., Lafayette, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 248 days.

(21) Appl. No.: 15/610,949

(22) Filed: Jun. 1, 2017

(65) Prior Publication Data

US 2017/0349009 A1 Dec. 7, 2017

Related U.S. Application Data

(60) Provisional application No. 62/346,756, filed on Jun. 7, 2016.

(51) Int. Cl.
*B60C 23/04* (2006.01)
*B60C 23/00* (2006.01)

(52) U.S. Cl.
CPC ........ *B60C 23/0486* (2013.01); *B60C 23/002* (2013.01); *B60C 23/003* (2013.01)

(58) Field of Classification Search
CPC .. B60C 23/0486; B60C 23/002; B60C 23/003
USPC ........................................ 152/416, 417, 418
See application file for complete search history.

(56) References Cited

U.S. PATENT DOCUMENTS

| | | |
|---|---|---|
| 2,317,636 A | 4/1943 | Parker |
| 4,311,985 A | 1/1982 | Gee et al. |
| 4,387,931 A | 6/1983 | Bland |
| 4,734,674 A | 3/1988 | Thomas et al. |
| 5,083,457 A | 1/1992 | Schultz |
| 5,483,826 A | 1/1996 | Schultz et al. |
| 5,618,361 A | 4/1997 | Colussi et al. |
| 5,637,926 A | 6/1997 | Zedonis |
| 6,087,930 A | 7/2000 | Kulka et al. |
| 6,144,295 A * | 11/2000 | Adams ................. B60C 23/003 137/224 |
| 6,175,302 B1 | 1/2001 | Huang |
| 6,229,434 B1 | 5/2001 | Knapp et al. |
| 6,278,363 B1 | 8/2001 | Bezek et al. |
| 6,535,116 B1 | 3/2003 | Zhou |
| 6,604,415 B2 | 8/2003 | Imao et al. |
| 6,662,642 B2 | 12/2003 | Breed et al. |
| 6,668,636 B2 | 12/2003 | Nantz et al. |
| 6,691,567 B2 | 2/2004 | Walker et al. |
| 6,705,152 B2 | 3/2004 | Routkevitch et al. |

(Continued)

*Primary Examiner* — S. Joseph Morano
*Assistant Examiner* — Jean W Charleston
(74) *Attorney, Agent, or Firm* — Quarles & Brady LLP

(57) ABSTRACT

A tire inflation system for use with a vehicle includes an airflow regulator configured to adjust a tire pressure of an inflatable tire coupled to an axle included in a wheel-axle system of a vehicle. The tire inflation system may further include a controller including a processor and a memory, the memory having stored therein a plurality of instructions that when executed by the processor cause the controller to receive data indicative of a force load acting on the axle and adjust the airflow regulator to cause the airflow regulator to control the tire pressure of the inflatable tire based on the data indicative of the force load acting on the axle.

20 Claims, 2 Drawing Sheets

(56) References Cited

U.S. PATENT DOCUMENTS

| | | | |
|---|---|---|---|
| 6,725,712 B1 | 4/2004 | King et al. | |
| 6,774,778 B2 | 8/2004 | Lin | |
| 6,813,940 B2 | 11/2004 | Lin | |
| 6,838,985 B2 | 1/2005 | Ghabra et al. | |
| 6,864,803 B2 | 3/2005 | Tang et al. | |
| 6,868,358 B2 | 3/2005 | Brown, Jr. | |
| 6,941,803 B2 | 9/2005 | Hirohama et al. | |
| 6,945,103 B1 | 9/2005 | Lee et al. | |
| 6,960,994 B2 | 11/2005 | Tabata et al. | |
| 6,975,215 B2 | 12/2005 | Schofield et al. | |
| 6,985,076 B1 | 1/2006 | Bennie et al. | |
| 7,385,485 B2 | 6/2008 | Thomas et al. | |
| 7,530,379 B1 | 5/2009 | Becker et al. | |
| 7,669,465 B2 | 3/2010 | Becker | |
| 7,975,739 B1 | 7/2011 | Ingram | |
| 8,245,746 B2 | 8/2012 | Stanczak | |
| 8,479,791 B2 | 7/2013 | Schulte et al. | |
| 8,857,484 B2 * | 10/2014 | Hinque | B60C 23/12 152/419 |
| 9,387,731 B2 | 7/2016 | Kranz | |
| 9,579,937 B2 * | 2/2017 | Hennig | B60C 23/02 |
| 10,464,379 B2 * | 11/2019 | Hennig | B60C 23/02 |
| 2003/0216845 A1 * | 11/2003 | Williston | B60C 23/003 701/36 |
| 2004/0231776 A1 * | 11/2004 | Skoff | B60C 23/003 152/416 |
| 2007/0194896 A1 | 8/2007 | Ehrlich et al. | |
| 2007/0257785 A1 | 11/2007 | Oboza | |
| 2011/0140875 A1 * | 6/2011 | Be | B60C 23/009 340/442 |
| 2013/0335214 A1 * | 12/2013 | Massey | B60C 23/00 340/442 |
| 2014/0076456 A1 * | 3/2014 | Kranz | B60C 23/003 141/4 |
| 2014/0261939 A1 * | 9/2014 | Therber | B60C 23/003 152/415 |
| 2015/0202931 A1 * | 7/2015 | Honig | B60C 23/001 152/416 |
| 2016/0318354 A1 * | 11/2016 | Trostle | B60C 23/0401 |
| 2018/0087681 A1 | 3/2018 | Ehrlich | |

* cited by examiner

LOAD REGULATED TIRE INFLATION SYSTEM

CROSS REFERENCE TO RELATED APPLICATIONS

This application claims priority to and the benefit of U.S. Provisional Patent Application No. 62/346,756 filed Jun. 7, 2016, which is incorporated herein by reference.

FIELD OF THE DISCLOSURE

The present disclosure relates generally to vehicles such as trailers, for example. In particular, the present disclosure relates to tire inflation systems used with semi-trailers.

BACKGROUND

Typical vehicles such as semi-trucks and trailers, for example, include axle assemblies that include an axle and a wheel with inflatable tires coupled to the axle. The wheels are configured to rotate relative to the axle about a rotation axis to move the vehicle. Some vehicles include tire inflation systems configured to adjust the tire pressure in the inflatable tires during operation and movement of the vehicle. Typical tire inflation systems include an airflow regulator configured to control a pressurized air source that is in fluid communication with the tire to keep the tire at a regulator set pressure thus overcoming small losses of air overtime.

SUMMARY

The present disclosure may comprise one or more of the features recited in the attached claims, and/or one or more of the following features and combinations thereof.

A tire inflation system may include an airflow regulator and a controller. The airflow regulator may be configured to adjust a tire pressure of an inflatable tire coupled to an axle included in a wheel-axle system of a vehicle. The controller may include a processor and a memory. The memory may have stored therein a plurality of instructions that when executed by the processor cause the controller to receive data indicative of a force load acting on the axle and adjust the airflow regulator to cause the airflow regulator to control the tire pressure of the inflatable tire based on the data indicative of the force load acting on the axle.

In illustrative embodiments, the airflow regulator comprises a preset regulator configured to move selectively between a plurality of finite pressure settings and the controller is configured to move the preset regulator to one of the pressure settings based on the data indicative of the force load acting on the axle.

In illustrative embodiments, the plurality of finite pressure settings included in the preset regulator includes an unloaded setting corresponding to a first pressure, a light-load setting corresponding to a second pressure, and a heavy-load setting corresponding to a third pressure, the third pressure is greater than the first and second pressures, and the second pressure is greater than the first pressure.

In illustrative embodiments, the unloaded setting is about 80 pounds per square inch.

In illustrative embodiments, the light-load setting is about 105 pounds per square inch.

In illustrative embodiments, the heavy-load setting is about 120 pounds per square inch.

In some embodiments, the airflow regulator comprises a variable pressure regulator configured to move selectively between infinite pressure settings.

In illustrative embodiments, the tire inflation system includes a strain gauge transducer.

In illustrative embodiments, the strain gauge transducer is configured to be coupled to the axle to generate the data indicative of the force load acting on the axle by measuring strain of the axle.

In some embodiments, the tire inflation system includes a pressure transducer.

In some embodiments, the pressure transducer is configured to be coupled to an air spring coupled with the axle and the pressure transducer is further configured to generate the data indicative of the force load acting on the axle by measuring air pressure in the air spring.

In some embodiments, the tire inflation system includes a pressure protection system configured to monitor the tire pressure of the tire and to generate a signal if the tire pressure is below a predetermined pressure.

In some embodiments, the predetermined pressure is about 70 pounds per square inch.

In some embodiments, the pressure protection system comprises a diaphragm switch.

In some embodiments, the diaphragm switch includes a diaphragm having a first surface and a second surface and the diaphragm switch is configured to generate a signal if a pressure acting the first surface is less than a predetermined pressure.

In some embodiments, the controller is configured to adjust the pressure regulator to cause the pressure regulator to block air from flowing to the tire if the tire pressure is below the predetermined pressure.

According to another aspect of the disclosure, a tire inflation system may include a preset pressure regulator. The preset pressure regulator may be configured to adjust a tire pressure of an inflatable tire included in a wheel-axle system of a vehicle. The preset pressure regulator may be configured to move selectively between a plurality of finite pressure settings. The plurality of finite pressure settings may include an unloaded setting corresponding to a first pressure, a light-load setting corresponding to a second pressure, and a heavy-load setting corresponding to a third pressure. The third pressure may be greater than the first and second pressures. The second pressure may be greater than the first pressure.

In illustrative embodiments, the tire inflation system includes the wheel-axle system.

In illustrative embodiments, the wheel-axle system includes the axle and the inflatable tire.

According to another aspect of the disclosure, a method of controlling tire inflation may include a number of steps. The method may include providing a wheel-axle system for use with a vehicle, the wheel-axle system including an axle assembly having an axle and an inflatable tire coupled to the axle, calculating a value indicative of a force load applied to the axle included in the vehicle, and adjusting a tire pressure of the inflatable tire based on the calculated value.

In illustrative embodiments, the step of calculating the value indicative of the force load applied to the axle includes the step of measuring a strain in the axle.

In illustrative embodiments, the step of calculating the value indicative of the force load includes calculating the force load based on the strain measurement.

In some embodiments, the axle assembly further includes an air spring coupled to the axle and the step of measuring the value indicative of the force load applied to the axle includes the step of measuring an air pressure inside the air spring.

In some embodiments, the step of measuring the value indicative of the force load applied to the axle includes calculating the force load based on the air pressure measurement.

In illustrative embodiments, the method includes measuring the tire pressure of the inflatable tire.

In illustrative embodiments, the method includes providing a preset pressure regulator in fluid communication with the inflatable tire and the preset pressure regulator is movable between a plurality of finite settings.

In illustrative embodiments, the step of adjusting the pressure includes moving the preset pressure regulator to one of the plurality of finite settings based on the calculated value.

In some embodiments, the method includes providing a variable pressure regulator in fluid communication with the inflatable tire and the variable pressure regulator is movable between an infinite number of settings.

In some embodiments, the step of adjusting the pressure includes moving the variable pressure regulator to one of the infinite number of settings based on the calculated value.

According to another aspect of the disclosure, a method of calibrating a tire inflation system includes a number of steps. The method may include coupling a transducer to an axle assembly included in a vehicle, measuring a first signal generated by the transducer, calculating a datum value based on the first signal measurement, applying a first weight force to the vehicle to cause the first weight force to be transmitted through the axle assembly, measuring a second signal generated by the transducer, and calculating a first threshold value based on the second signal measurement.

In illustrative embodiments, the axle assembly includes an axle and an inflatable tire coupled to the axle.

In illustrative embodiments, the transducer comprises a strain gauge transducer.

In illustrative embodiments, the method further comprises coupling the strain gauge transducer to the axle.

In illustrative embodiments, the axle assembly includes an axle and an air spring coupled to the axle.

In some embodiments, the transducer comprises a pressure transducer.

In some embodiments, the method further comprises coupling the pressure transducer with the air spring.

In illustrative embodiments, the method further includes applying a second weight force to the vehicle to cause the second weight force to be transmitted through the axle assembly, measuring a third signal generated by the transducer, and calculating a second threshold value based on the third signal measurement.

DETAILED DESCRIPTION OF THE DRAWINGS

Figure 1:
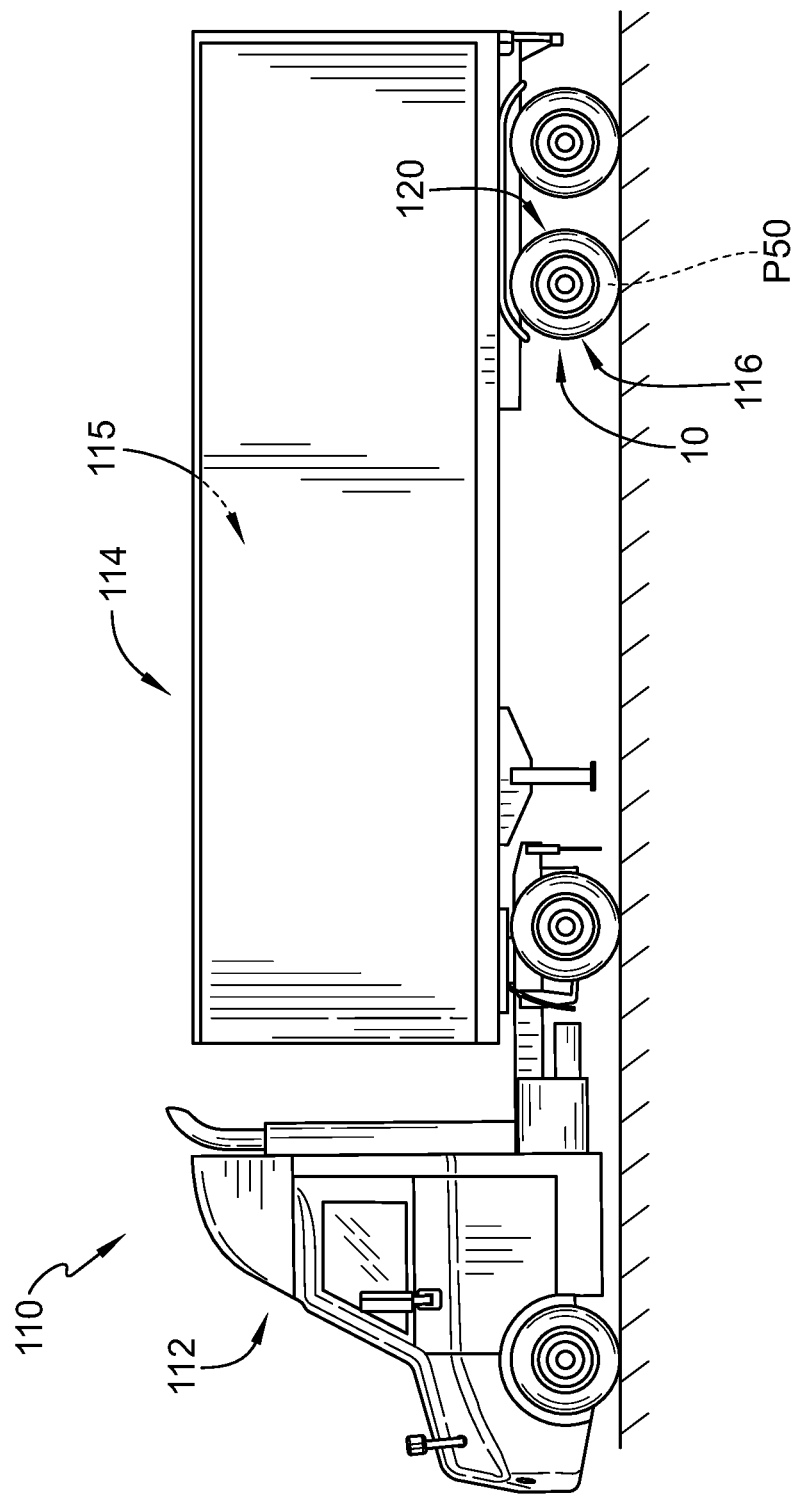
FIG. 1 is an elevation view of a tractor-trailer having a tire inflation system in accordance with the present disclosure.

For the purposes of promoting an understanding of the principles of the disclosure, reference will now be made to a number of illustrative embodiments illustrated in the drawings and specific language will be used to describe the same.

While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present disclosure may be implemented in a number of different applications and embodiments and is not specifically limited in its application to the particular embodiments depicted herein.

An illustrative tire inflation system 10 accordance with the present disclosure is coupled to a wheel-axle system 116 of a tractor-trailer 110 as shown in FIG. 1. The tractor-trailer 110 includes a semi-tractor 112 and a trailer 114 coupled to the semi-tractor 112 for transporting cargo stored inside a cargo storage region 115 of the trailer 114. The wheel-axle system 116 includes an axle assembly 118 and inflatable tires 120 configured to rotate about a rotational axis 122 of the axle assembly 118 during movement of the tractor-trailer 110 as suggested in FIGS. 1 and 2.

Figure 2:
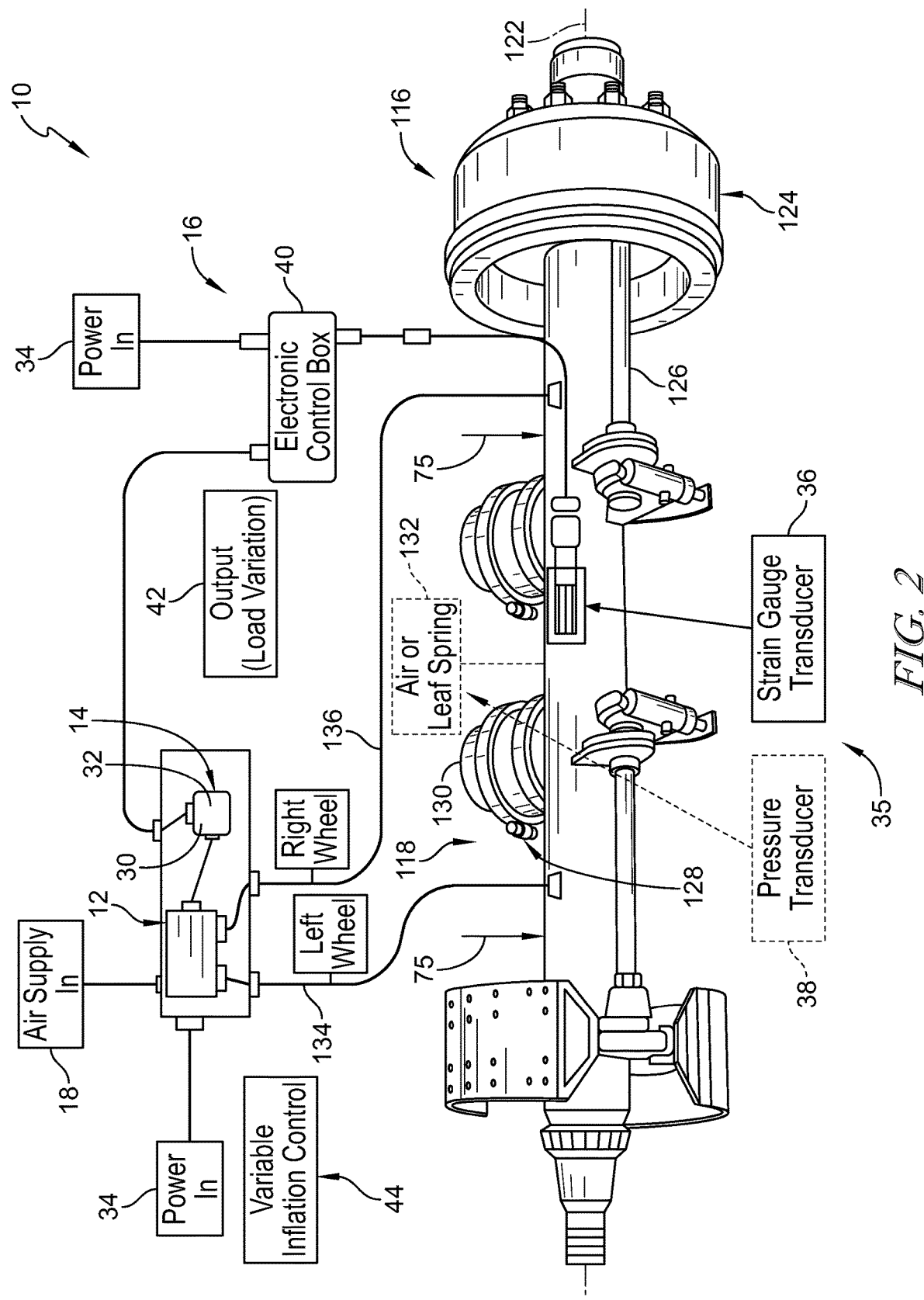
FIG. 2 is a perspective and diagrammatic view of the tire inflation system of FIG. 1 coupled to an axle assembly included in the tractor-trailer.

The cargo supported by the trailer 114 applies a force load 75 to the axle assembly 118 and the tires 120 due to a weight of the cargo as suggested in FIG. 2. Tire wear, fuel efficiency, and vehicle control may be improved when the tires 120 are properly inflated based on a given force load 75 acting on the axle assembly 118. For example, a relatively greater tire pressure may be desired for a large force load 75.

In the illustrative embodiment, the tire inflation system 10 includes an airflow regulator 12, a controller 14, and a sensor system 16 having a transducer 35 as shown in FIG. 2. The transducer 35 (axle strain gauge 36 for leaf (e.g., of a metal or composite material) spring suspension or air pressure gauge 38 for an air spring suspension for example) is configured to measure a property of the axle assembly 118 that is indicative of the force load 75 acting on the axle assembly 118 and send a signal indicative of the force load 75 to the controller 14. The controller 14 adjusts the airflow regulator 12 based on the signal received from the transducer 35. As a result, the airflow regulator 12 adjusts a tire pressure P50 of the inflatable tire 120 up or down to arrive at the desired tire pressure for the force load 75 acting on the axle assembly 118. For example, the controller 14 may select a setting on a variable pressure regulator or may select a preset position on a preset regulator to control the tire pressure set pressure. If multiple axle assemblies 118 are equalized by a suspension system, a single transducer 35 may be used for the controller 14 and regulator 12 to regulate the tire pressure 50 in each tire 120 included in the multiple axle assemblies 118.

As shown in FIG. 2, the wheel-axle system 116 includes the axle assembly 118 and at least one wheel assembly 124. The axle assembly 118 is configured to couple the wheel-axle system 116 to the trailer 114. The wheel assembly 124 is configured to rotate about the rotational axis 122 during movement of the tractor-trailer 110.

The illustrative axle assembly 118 includes an axle 126 and suspension (not shown), as shown in FIG. 2. The axle 126 extends across a width of the trailer 114 and couples with the wheel assembly 124. In the illustrative embodiment, the axle 126 is formed to include passageways that receive conduits 134, 136 for conducting air into and out of the tires 120 of the wheel assemblies 124. A suspension system (air or leaf spring, not shown) transfers the load 75 from the trailer 114 to the axle 126. In the illustrative embodiment, the suspension includes springs comprising metallic leaf springs of steel or composite materials. In other embodiments, the suspension includes air or leaf springs 132 to cushion the trailer 114 from road conditions.

The airflow regulator 12 of the tire inflation system 10 is fluidly connected to a pressurized air supply 18 and fluidly connected to the tires 120 as suggested in FIG. 2. The airflow regulator 12 is adjustable to selectively control the pressure of airflow allowed to flow between the air supply 18 and one or more of the tires 120. As such, the regulator 12 may inflate and deflate the tires 120. The airflow regulator 12 and the tires 120 are fluidly connected such that air may flow from the airflow regulator 12 toward the tire 120 or from the tire 120 toward the airflow regulator. As such, the tire 120 may receive air in response to the airflow regulator 12 being adjusted up to a higher pressure and the tires 120 may lose air in response to the airflow regulator 12 being adjusted down to a lower pressure.

In some embodiments, the airflow regulator and the tires 120 are connected via two-way valves. In the illustrative embodiment, the airflow regulator 12 is fluidly connected to a left wheel conduit 134 for inflating and deflating a left tire and a right wheel conduit 136 for inflating and deflating a right tire. While a direct wheel feed is shown in FIG. 2, in other embodiments, a single line may be connected between and in fluid communication with the airflow regulator 12 and an axle chamber feed in the axle 126. In this embodiment, the axle 126 would act as a pressure chamber providing air to the left and right tires.

In the illustrative embodiment, the airflow regulator 12 comprises a variable pressure regulator 12 coupled to a power source 34. The variable pressure regulator 12 may be set at one of a plurality of positions to vary the pressure of air in the tires 120. The controller 14 is configured to adjust the variable pressure regulator 12 based on the data indicative of the force load 75. Illustratively, if the force load 75 increases, the controller 14 adjusts the variable pressure regulator 12 to cause the tire pressure P50 to increase. If the force load 75 decreases, the controller 14 adjust the variable pressure regulator 12 to cause the tire pressure P50 to decrease, as an example. In some embodiments, the increase or decrease of the variable pressure regulator 12 is proportional with the increase or decrease of the force load 75.

In other embodiments, the airflow regulator 12 comprises a preset regulator 12. The preset regulator 12 may be set to one of a finite number of positions to vary the pressure of air in the tires 120. For example, the preset regulator may have three positions such as, for example, an unloaded setting, a light-load setting, and a heavy-load setting. The three positions correspond to the desired tire pressure for empty, medium, and heavy loads on the trailer 114. The heavy-load setting causes the tire 120 to have a large tire pressure that is greater than the tire pressures corresponding with the light-load setting or unloaded setting. The light-load setting causes the tire 120 to have a tire pressure that is greater than the tire pressure corresponding with the unloaded setting.

In one example, the unloaded setting is about 80 pounds per square inch, the light-load setting is about 105 pounds per square inch, and the heavy-load setting is about 120 pounds per square inch. In some embodiments, the controller 14 is omitted and an operator of the trailer 114 manually sets the preset pressure regulator 12 based on their knowledge of the trailer 114 being unloaded or having a light or heavy load.

Illustratively, the airflow regulator 12 is included in a variable inflation control system 44 as shown in FIG. 2. The variable inflation control system 44 includes the airflow regulator 12, the air supply 18, power source 34, and the controller 14.

The controller 14 is configured to receive signals from the sensor system 16 and adjust the airflow regulator 12 in response to the signals received from the sensor system 16. The controller 14 includes a processor 30 and a memory 32. The memory 32 has, stored therein, a plurality of instructions that are executable by the processor 30. In the illustrative embodiment, the instructions, when executed by the processor 30, cause the controller to receive data indicative of the force load 75 acting on the axle 126 coupled to the inflatable tire 120 and transmit a signal to the airflow regulator 12 to cause the airflow regulator 12 to adjust the tire pressure P50 of the inflatable tire 120 based on the data indicative of the force load 75 acting on the axle 126. The data indicative of the force load 75 may be a calculated force load 75, a strain measurement of the axle 126 indicative of the force load 75, an air pressure measurement of the air or leaf spring 132 indicative of the force load 75, or any other data that correlates with or measures the force load 75.

The sensor system 16 includes the transducer 35 (sometimes called sensor) configured to measure one or more properties of the wheel-axle system 116 to be used to determine the force load 75 applied to the axle 126 and/or used to determine a value indicative of the force load 75 applied to the axle 126 as suggested in FIG. 2. In the illustrative embodiment, the sensor system 16 includes the strain gauge transducer 36 as shown in FIG. 2. Illustratively, the strain gauge transducer 36 is coupled to the axle 126 at about a midpoint of the axle 126. The strain gauge transducer 36 is configured to generate data (sometimes called signals) indicative of the force load 75 acting on the axle 126 by measuring strain in the axle 126. In the illustrative embodiment, the strain gauge transducer 36 is coupled with the axle 126 with epoxy.

In some embodiments, the sensor system 16 includes a pressure transducer 34 coupled to the air or leaf spring 132 included in the wheel-axle system 116 as suggested in FIG. 2. The pressure transducer 38 is configured to generate data indicative of the force load 75 acting on the axle 126 by measuring air pressure in the air or leaf spring 132. As an example, as the force load 75 increases, the air pressure of the air or leaf spring 132 increases.

In the illustrative embodiment, the sensor system 16 includes the strain gauge transducer 36 and an electronic control box 40 as shown in FIG. 2. The electronic control box 40 is powered by the power source 34 and is configured to power the strain gauge transducer 36. In the illustrative embodiment, the electronic control box 40 is configured to manage the data from the strain gauge transducer 36 including signal strength, wave forms, data conversion, etc. The electronic control box 40 sends the data indicative of the force load 75 via load variation output 42 to the controller 14 as suggested in FIG. 2.

In embodiments having the preset pressure regulator 12, the controller 14 has predetermined threshold values stored in the memory 32. For example, the illustrative memory 32 includes a predetermined light-load threshold value and a predetermined heavy-load threshold value. If a value of the data indicative of the load force 75 is below the predetermined light-load threshold value, the controller 14 sets the regulator 12 to the unloaded setting. If the value of the data indicative of the load force 75 is between the predetermined light-load threshold value and the heavy-load threshold value, the controller 14 sets the regulator 12 to the light-load setting. If the value of the data indicative of the load force 75 exceeds the predetermined heavy-load threshold value, the controller 14 sets the regulator 12 to the heavy-load setting. In embodiments having the variable pressure regulator, the controller 14 is calibrated to adjust the variable pressure regulator 12 based on the variable signal indicative of the load force 75.

In some embodiments, the system 10 includes a pressure protection system. The pressure protection system is configured to determine if a tire 120 has failed or may be about to fail. In some embodiments, the pressure protection system monitors the tire pressure and generates an alert to inform the operator of the low pressure tire 120 if the pressure protection system detects that the tire pressure P50 of a given tire 120 falls below a predetermined shut-off pressure value. As an example, the tire pressure P50 may fall below the shut-off pressure value if the tire 120 is damaged and air is escaping through the tire 120 or wheel assembly 124.

In some embodiments, the controller 14 instructs the airflow regulator 12 to block airflow to the tire 120 if the pressure protection system detects that the tire pressure PSO of a given tire 120 falls below the predetermined shut-off pressure. In some embodiments, the pressure protection system includes a valve configured to block airflow to the tire 120 if the tire pressure P50 is below the predetermined shut-off pressure value. In the illustrative embodiment, the shut-off pressure value is about 70 pounds per square inch.

In some embodiments, the pressure protection system generates a signal that indicates that the tire 120 is taking on air and that the tire 120 is losing air faster than the inflation system 10 can provide air to the tire 120. As such, the pressure protection system may indicate that the tire 120 has been compromised if the inflation system 10 cannot provide more air to the tire 120 than the tire 120 is losing. In some embodiments, the pressure protection system is configured to provide a signal to a cab of the semi-tractor 112 to alert an operator that the tire 120 is losing air faster than the system 10 can replenish it. The pressure protection system may include a diaphragm switch configured to determine if the tire 120 is losing air faster than the inflation system 10 can provide air to the tire 120. In some embodiments, the pressure protection system is incorporated into the controller 14.

The transducer 35, controller 14, regulator 12 and other components of the tire inflation system 10 may be wire or wireless. In the illustrative embodiment, the controller 14 is configured to communicate with a cab of the semi-tractor 112 wirelessly.

An illustrative method of controlling tire inflation of the tire 120 using the tire inflation system 10 includes a number of steps. In some embodiment, the method includes providing the wheel-axle system 116 for use with a vehicle 110 such as the tractor-trailer 110 for example. The method may further include calculating a value indicative of the force load 75 applied to the axle 126 included in the vehicle 110 and adjusting the tire pressure P50 of the inflatable tire 120 based on the calculated value.

In some embodiments, the step of calculating the value indicative of the force load 75 applied to the axle 126 includes the step of measuring a strain in the axle 126. In some embodiments, the step of calculating the value indicative of the force load 75 includes calculating the force load 75 based on the strain measurement. In some embodiments, the step of measuring the value indicative of the force load 75 applied to the axle 126 includes the step of measuring the air pressure inside the air or leaf spring 132. In some embodiments, the step of measuring the value indicative of the force load 75 applied to the axle 126 includes calculating the force load 75 based on an air pressure measurement. In some embodiments, the step of adjusting the tire pressure P50 includes adjusting the tire pressure P50 of the inflatable tire 120 if the value indicative of the force load 75 is greater than the predetermined loaded-trailer threshold value.

A method of calibrating the tire inflation system 10 may include a number of steps. In some embodiments, the method includes, coupling a transducer 35 to the axle assembly 118 included in the vehicle 110, measuring a first signal generated by the transducer 35, calculating a datum value based on the first signal measurement, applying a first weight force to the vehicle 110 to cause the first weight force to be transmitted through the axle assembly 118, measuring a second signal generated by the transducer 35, and calculating a first threshold value based on the second signal measurement. In some embodiments, the method further comprises coupling the strain gauge transducer 36 to the axle 126.

In some embodiments, the method includes measuring the weight acting on the tires 120 coupled with the axle assembly 118. In some embodiments, the method further comprises coupling the pressure transducer 38 with the air or leaf spring 132. In some embodiments, the method includes applying a second weight force to the vehicle 110 to cause the second weight force to be transmitted through the axle assembly 118, measuring a third signal generated by the transducer 35, and calculating a second threshold value based on the third signal measurement.

To optimize tire life and increase fuel efficiency, the tire pressure in the inflatable tires may be adjusted to a proper pressure based on the load force acting on the tire. The load force acting on the axle supporting the tire may be used as a proxy for the load force acting on the tire. A sensor mounted on each axle (or one axle if a plurality of axles are equalized through suspension such as, for example, with a rocker) may be used to sense the strain on the axle. The sensor may include a strain gauge transducer, pressure transducer, or any other suitable sensor for calculating a force load on the axle or tires.

The weight measuring transducer (axle strain gauge for leaf spring or air pressure for air spring) sends a signal to a) reset a variable pressure regulator or b) select the proper preset regulator to control the tire pressure set pressure. The regulator then adjusts the tire pressure up or down to arrive at the proper tire pressure for the measured load on the axle (or proxy for the load). A single weight measuring controller may be used if the axle loads are equalized via the suspension.

During calibration, the sensor is zeroed with an empty vehicle. Then the vehicle is loaded, and the strain or pressure is calibrated to the increase in axle load. The increase can then drive the regulator pressure setting of the tire inflation system. As such, a proper tire pressure may be achieved according to tire load for vehicles with leaf spring and air spring axle assemblies.

In some embodiments, tire pressure set points are stored on the controller such as light, medium, and heavy load to simplify the control. In some embodiments, the tire inflation system includes a pressure protection at the valve stem feed to prevent total loss of tire air if one tire goes flat or a failure of the rotary seal in the wheel end occurs. The pressure protection would cut off further pressure loss at a runnable (lower speed) and should provide warning to alert the operator to isolate the damaged tire from the remaining tires in the system.

Due to a number of variables including a variable cargo weight for each trip, the distribution of the cargo in the cargo storage region 115 of the trailer 114, and the complications of determining the force load 75 during movement of the tractor-trailer 110, it may be difficult to determine the force load 75 applied to each axle 126 of the tractor-trailer 110 during operation of the tractor-trailer 110. Furthermore, the tires 120 may heat or cool during operation which may change the tire pressure P50. As such, it may be difficult to dynamically determine a proper tire pressure for a given cargo load and to maintain the proper tire pressure P50 during operation of the tractor-trailer 110. The tire inflation system 10 provides the ability to determine proper tire pressures during operation of the tractor-trailer 110 and to set the tire pressure during operation of the tractor-trailer 110.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A tire inflation system comprising:
   an airflow regulator configured to adjust a tire pressure of an inflatable tire coupled to an axle included in a wheel-axle system of a vehicle, and
   a controller including a processor and a memory, the memory having stored therein a plurality of instructions that when executed by the processor cause the controller to:
   receive data indicative of a force load acting on the axle, and
   adjust the airflow regulator to cause the airflow regulator to control the tire pressure of the inflatable tire based on the data indicative of the force load acting on the axle,
   wherein the airflow regulator is selectively adjusted between a plurality of finite pressure settings including an unloaded setting corresponding to a first pressure, a light-load setting corresponding to a second pressure, and a heavy-load setting corresponding to a third pressure, the third pressure is greater than the first and second pressures, and the second pressure is greater than the first pressure.

2. The tire inflation system of claim 1, wherein the airflow regulator comprises a preset regulator configured to move selectively between the plurality of finite pressure settings and the controller is configured to move the preset regulator to one of the plurality of finite pressure settings based on the data indicative of the force load acting on the axle.

3. The tire inflation system of claim 1, wherein the unloaded setting is about 80 pounds per square inch, the light-load setting is about 105 pounds per square inch, and the heavy-load setting is about 120 pounds per square inch.

4. The tire inflation system of claim 1, further comprising a strain gauge transducer configured to be coupled to the axle to generate the data indicative of the force load acting on the axle by measuring strain in the axle.

5. The tire inflation system of claim 1, further comprising a pressure transducer configured to be coupled to an air spring coupled with the axle and the pressure transducer is further configured to generate the data indicative of the force load acting on the axle by measuring air pressure in the air spring.

6. The tire inflation system of claim 1, further comprising a pressure protection system configured to monitor the tire pressure of the tire and to generate a signal if the tire pressure is below a predetermined pressure.

7. The tire inflation system of claim 6, wherein the pressure protection system comprises a diaphragm switch configured to determine if the inflatable tire is losing air faster than the airflow regulator can provide air to the inflatable tire.

8. The tire inflation system of claim 6, wherein the controller is configured to adjust the airflow regulator to cause the airflow regulator to block air from flowing to the inflatable tire if the tire pressure is below the predetermined pressure.

9. The tire inflation system of claim 1, wherein when a value of the data indicative of the force load on the axle is below a predetermined light-load threshold, the controller adjusts the airflow regulator to the unloaded setting.

10. The tire inflation system of claim 9, wherein when the value of the data indicative of the force load on the axle is above a predetermined heavy-load threshold, the controller adjusts the airflow regulator to the heavy-load setting.

11. The tire inflation system of claim 10, wherein when a value of the data indicative of the force load on the axle is between the predetermined light-load threshold and the predetermined heavy-load threshold, the controller adjusts the airflow regulator to the light-load setting.

12. A method of controlling tire inflation using a tire inflation system with an airflow regulator and a controller, the controller including a processor and a memory, the method comprising:
   providing a wheel-axle system for use with a vehicle, the wheel-axle system including an axle assembly having an axle and an inflatable tire coupled to the axle;
   receiving data indicative of a force load applied to the axle; and
   adjusting the airflow regulator to control a tire pressure of the inflatable tire based on the received data indicative of the force load applied to the axle,
   wherein adjusting the airflow regulator includes selectively adjusting the airflow regulator between a plurality of finite settings including an unloaded setting corresponding to a first pressure, a light-load setting corresponding to a second pressure, and a heavy-load setting corresponding to a third pressure, the third pressure is greater than the first and second pressures, and the second pressure is greater than the first pressure.

13. The method of claim 12, wherein receiving the data includes calculating a value indicative of the force load applied to the axle by measuring a strain in the axle and calculating the force load based on the strain measurement.

14. The method of claim 12, wherein the axle assembly further includes an air spring coupled to the axle and receiving the data includes calculating a value indicative of the force load applied to the axle by measuring an air pressure inside the air spring and calculating the force load based on the air pressure measurement.

15. The method of claim 12, further comprising measuring the tire pressure of the inflatable tire.

16. The method of claim 15 and further comprising blocking air from flowing to the inflatable tire when the tire pressure falls below a predetermined pressure value.

17. The method of claim 12, wherein the airflow regulator is a preset pressure regulator in fluid communication with the inflatable tire and the preset pressure regulator is movable between the plurality of finite settings, wherein adjusting the tire pressure includes moving the preset pressure regulator to one of the plurality of finite settings based on the data.

18. The method of claim 12, further comprising adjusting the airflow regulator to the unloaded setting when a value of the data indicative of the force load on the axle is less than a predetermined light-load threshold.

19. The method of claim 18, further comprising adjusting the airflow regulator to the heavy-load setting when the value of the data indicative of the force load on the axle is greater than a predetermined heavy-load threshold.

20. The method of claim 19, further comprising adjusting the airflow regulator to the light-load setting when a value of the data indicative of the force load on the axle is greater than the predetermined light-load threshold and less than the predetermined heavy-load threshold.

\* \* \* \* \*